United States Patent
Depew et al.

(10) Patent No.: US 11,706,474 B2
(45) Date of Patent: Jul. 18, 2023

(54) USER PREFERENCES BASED SYNTHESIS OF GROUP RECOMMENDATIONS

(71) Applicant: Disney Enterprises, Inc., Burbank, CA (US)

(72) Inventors: Sarah Depew, Pasadena, CA (US); Claudia Cervon, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/525,632

(22) Filed: Nov. 12, 2021

(65) Prior Publication Data

US 2023/0156259 A1    May 18, 2023

(51) Int. Cl.
*H04N 21/25*    (2011.01)
*H04N 21/2668*    (2011.01)

(52) U.S. Cl.
CPC ....... *H04N 21/2668* (2013.01); *H04N 21/252* (2013.01)

(58) Field of Classification Search
CPC .................................................. H04N 21/252
See application file for complete search history.

(56) References Cited

U.S. PATENT DOCUMENTS

| | | | |
|---|---|---|---|
| 8,316,020 B1 * | 11/2012 | Kleinmann | G06Q 30/02 707/734 |
| 2009/0328105 A1 * | 12/2009 | Craner | H04N 21/44224 725/46 |
| 2018/0137121 A1 * | 5/2018 | Agarwal | G06F 16/437 |

OTHER PUBLICATIONS

"Celebrate Your Unique Listening Style With Spotify's Only You In-App Experience" https://newsroom.spotify.com/2021-06-02/celebrate-your-unique-listening-style-with-spotifys-only-you-in-app-experience/ pp. 1-6.
Dior Official website. www.dior.com/en_us pp. 1-6.
"Family Mix" https://support.spotify.com/us/article/family-mix/. pp. 1-4.
"Family Sharing. Share your favorite things with your favorite people." https://www.apple.com/family-sharing/ pp. 1-13.
"Data & privacy" https://myaccount.google.com/intro/data-and-personalization pp. 1-2.
"People & sharing" https://myaccount.google.com/intro/people-and-sharing pp. 1-2.

(Continued)

*Primary Examiner* — Michael H Hong
(74) *Attorney, Agent, or Firm* — Farjami & Farjami LLP

(57) ABSTRACT

A system includes a computing platform having processing hardware and a memory storing an asset library and software code including a recommendation engine. The processing hardware executes the software code to receive, from a user, group generation data and a preferences profile of the user, the group generation data identifying a group including the user and another user, and to send, to the other user, an invitation to join the group. The processing hardware also executes the software code to receive, from the other user, one of an acceptance or a refusal of the invitation, obtain, in response to receiving the acceptance, a preferences profile of the other user, generate, using the preferences profiles of the user and the other user, a group preferences profile for the group, and identify, using the recommendation engine and the group preferences profile, one or more assets in the asset library for the group.

22 Claims, 5 Drawing Sheets

(56) References Cited

OTHER PUBLICATIONS

"Your family on Google" https://families.google.com/families?hl=en&utm_source=google-account&utm_medium=web pp. 1-6.

Steve Berry, Steven Fazzio, Yongyi Zhou, Bethany Scott, Luis Francisco-Revilla "Netflix Recommendations for Groups" 2010 https://asistdl.onlinelibrary.wiley.com/doi/pdf/10.1002/meet.14504701402 pp. 1-2.

Carlos A. Gomez-Uribe, Neil Hunt "The Netflix Recommender System: Algorithms, Business Value, and Innovation" ACM Transactions on management Information Systems, vol. 6, Issue 4, Jan. 2016. https://dl.acm.org/doi/10.1145/2843948 pp. 1-3.

Koen Verstrepen, Bart Goethals "Top-N Recommendations for Shared Accounts" Sep. 2015 https://www.researchgate.net/publication/301432310_TopN_Recommendation_for_Shared_Accounts pp. 1-13.

Alison DeNisco Rayome "Watch Disney Plus with froends now with GroupWatch feature—here's how" CNET Tech Sep. 21, 2021 https://tig.disney.com/2021/03/18/co-watching/ pp. 1-4.

Ashley Carman "Spotify will let you filter your liked songs by mood or genre. For both free and premium users" The Verge. Feb. 25, 2021. pp. 1-2 https://www.theverge.com/2021/2/25/22301015/spotify-liked-songs-filters-update.

\* cited by examiner

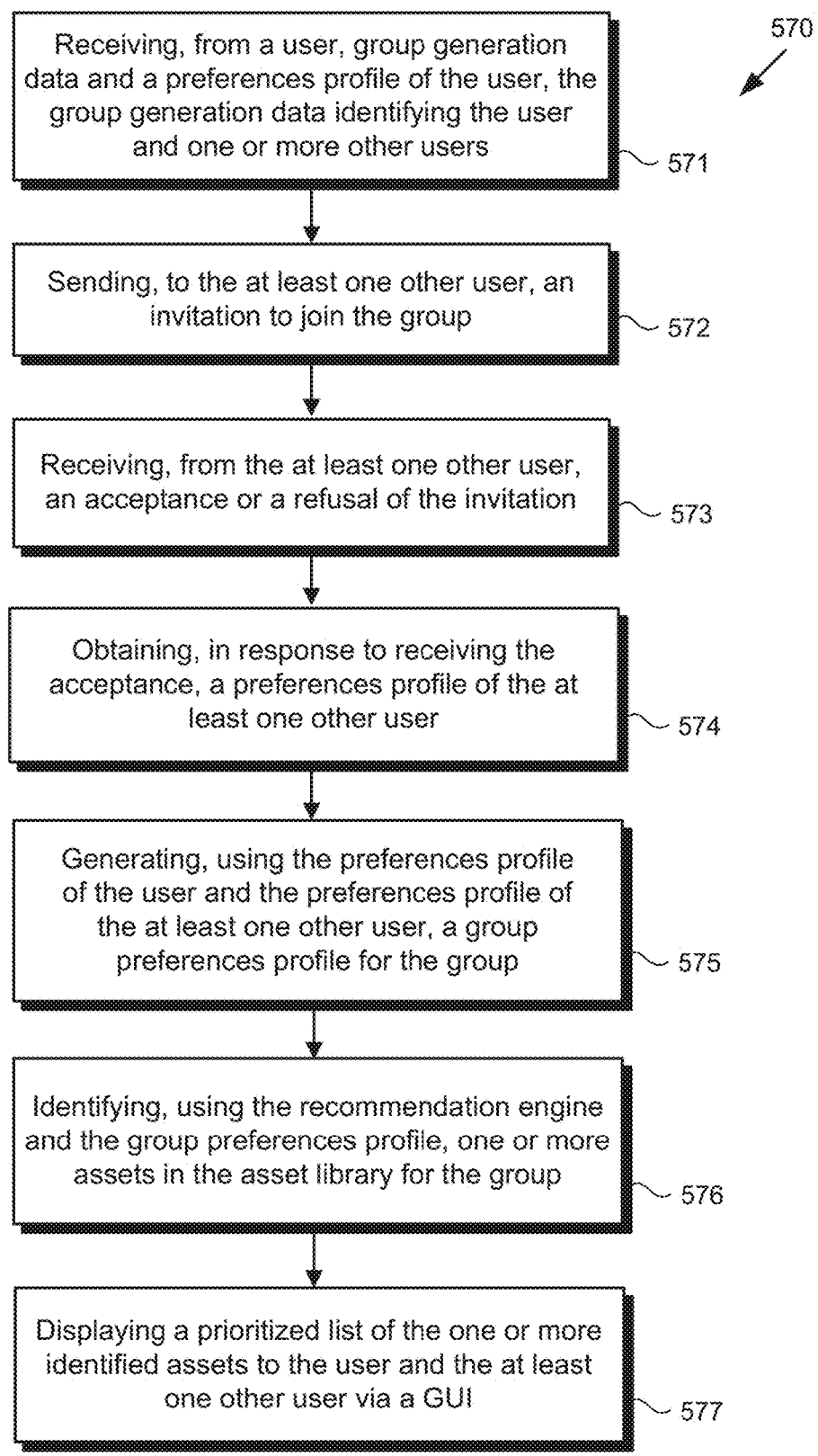

USER PREFERENCES BASED SYNTHESIS OF GROUP RECOMMENDATIONS

BACKGROUND

Various types of entertainment experiences can be enhanced when they are enjoyed by a group. For example, a theme park outing or attendance at a concert or sporting event may be more enjoyable when friends attend together. Even the relatively passive consumption of digital media content may be enhanced when such content is consumed in a group session. Nevertheless, the popularity of a particular theme park ride, sport, entertainment event, or genre of digital media content can vary widely. As a result, oftentimes in a group situation, such as a group outing or group watch session, it may be difficult to come to a consensus about what experience to enjoy together. In fact, in some instances, the process of coming to a decision can undesirably take more time than the actual activity itself.

BRIEF DESCRIPTION OF THE DRAWINGS

FIG. 5 shows a flowchart outlining a method for performing user preferences based synthesis of group recommendations, according to one implementation.

DETAILED DESCRIPTION

Figure 1:
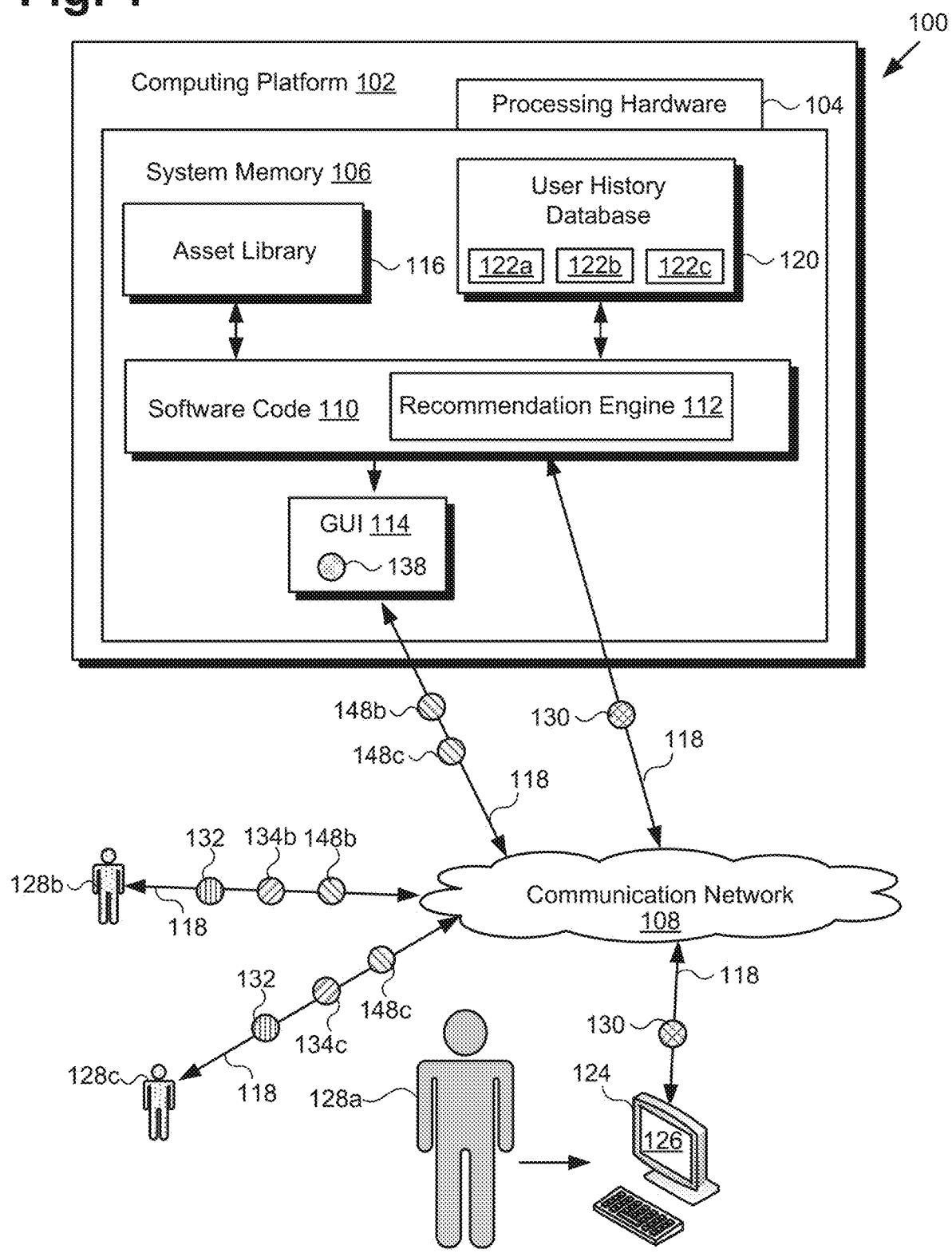
FIG. 1 shows an exemplary system for performing user preferences based synthesis of group recommendations, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing user preferences based synthesis of group recommendations. The group recommendation solution disclosed in the present application provides a recommendation identifying assets, such as digital media content, activities, and events, for example that are predicted to be enjoyable to a group based on the preferences of each member of the group. A unifying concept behind the various implementations disclosed herein is the use of customized individual user preferences profiles to create a group preferences profile for the group, which can be manually adjusted by any group member, to filter available assets using the group preferences profile, and to recommend assets for the group based on the group preferences and the available assets. It is noted that, as used in the present application, the term "group" refers to two or more individuals.

In some implementations, the systems and methods disclosed by the present application may be substantially or fully automated. It is noted that, as used in the present application, the terms "automation," "automated," and "automating" refer to systems and processes that do not require the participation of a human system administrator. Although, in some implementations, a system administrator may review or modify the group recommendations generated by the automated systems and according to the automated methods described herein, that human involvement is optional. Thus, in some implementations, the methods described in the present application may be performed under the control of hardware processing components of the disclosed automated systems.

FIG. 1 shows an exemplary system for performing user preferences based synthesis of group recommendations, according to one implementation. As shown in FIG. 1, system 100 includes computing platform 102 having processing hardware 104 and system memory 106 implemented as a computer-readable non-transitory storage medium. According to the present exemplary implementation, system memory 106 stores asset library 116, user history database 120, and software code 110 including recommendation engine 112. Also shown in FIG. 1 are graphical user interface (GUI) 114 provided by software code 110, group recommendation 138 displayed via GUI 114, user 128a, user history 122a of user 128a, other users 128b and 128c, and user histories 122b and 122c of respective users 128b and 128c.

It is noted that user history 122a may include the asset acquisition history, search history, or both, of user 128a, while user histories 122b and 122c may analogously include the asset acquisition histories, search histories, or both of respective users 128b and 128c. Thus, in implementations in which the assets of interest are digital media content in the form of movies, music videos, video games, and television (TV) series, or particular TV episodes, whether broadcasted or streamed, user histories 122a. 122b, and 122c may include the digital media content consumption and search histories of respective users 128a, 128b, and 128c.

As further shown in FIG. 1, system 100 is implemented within a use environment including communication network 108 and user system 124 including display 126. In addition, FIG. 1 shows group generation data 130, invitation 132 sent to each of users 128b and 128c, invitation response 134b from user 128b, invitation response 134c from user 128c, preferences profile 148b of user 128b, and preferences profile 148c of user 128c. Also shown in FIG. 1 are network communication links 118 of communication network 108 interactively connecting system 100 with user system 124 and communication devices utilized by users 128b and 128c (communication devices of users 128b and 128c not shown in FIG. 1).

It is noted that although in some implementations, as depicted in FIG. 1, asset library 116 may be stored in system memory 106, in other implementations asset library 116 may not be included in system 100, but may merely be accessible to system 100 via communication network 108 and network communication links 118. It is further noted that, in some implementations, recommendation engine 112 of software code 110 may include one or more machine learning predictive models.

As defined in the present application, the expression "machine learning predictive model" or "ML predictive model" may refer to a mathematical model for making future predictions based on patterns learned from samples of data or "training data." Various learning algorithms can be used to map correlations between input data and output data. These correlations form the mathematical model that can be used to make future predictions on new input data. Such a machine learning predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing, audio processing, or natural-language processing.

Although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, although FIG. 1 depicts software code 110 and user history database 120 as being co-located in system memory 106, that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may be implemented virtually, such as in a data center. For example, in some implementations, system 100 may be implemented in software, or as virtual machines.

Although user system 124 is shown as a desktop computer in FIG. 1, that representation is also provided merely as an example. More generally, user system 124 may be any suitable mobile or stationary computing device or system that implements data processing capabilities sufficient to enable use of GUI 114, support connections to communication network 108, and implement the functionality ascribed to user system 124 herein. For example, in other implementations, user system 124 may take the form of a laptop computer, tablet computer, smart TV, game platform, smartphone, or smart wearable device, such as a smartwatch, for example.

Display 126 of user system 124 may take the form of a liquid crystal display (LCD), a light-emitting diode (LED) display, an organic light-emitting diode (OLED) display, a quantum dot (QD) display, or any other suitable display screen that performs a physical transformation of signals to light. It is noted that, in some implementations, display 126 may be integrated with user system 124, such as when user system 124 takes the form of a laptop or tablet computer for example. However, in other implementations, for example where user system 124 takes the form of a computer tower in combination with a desktop monitor, display 126 may be communicatively coupled to, but not physically integrated with user system 124.

Figure 2:
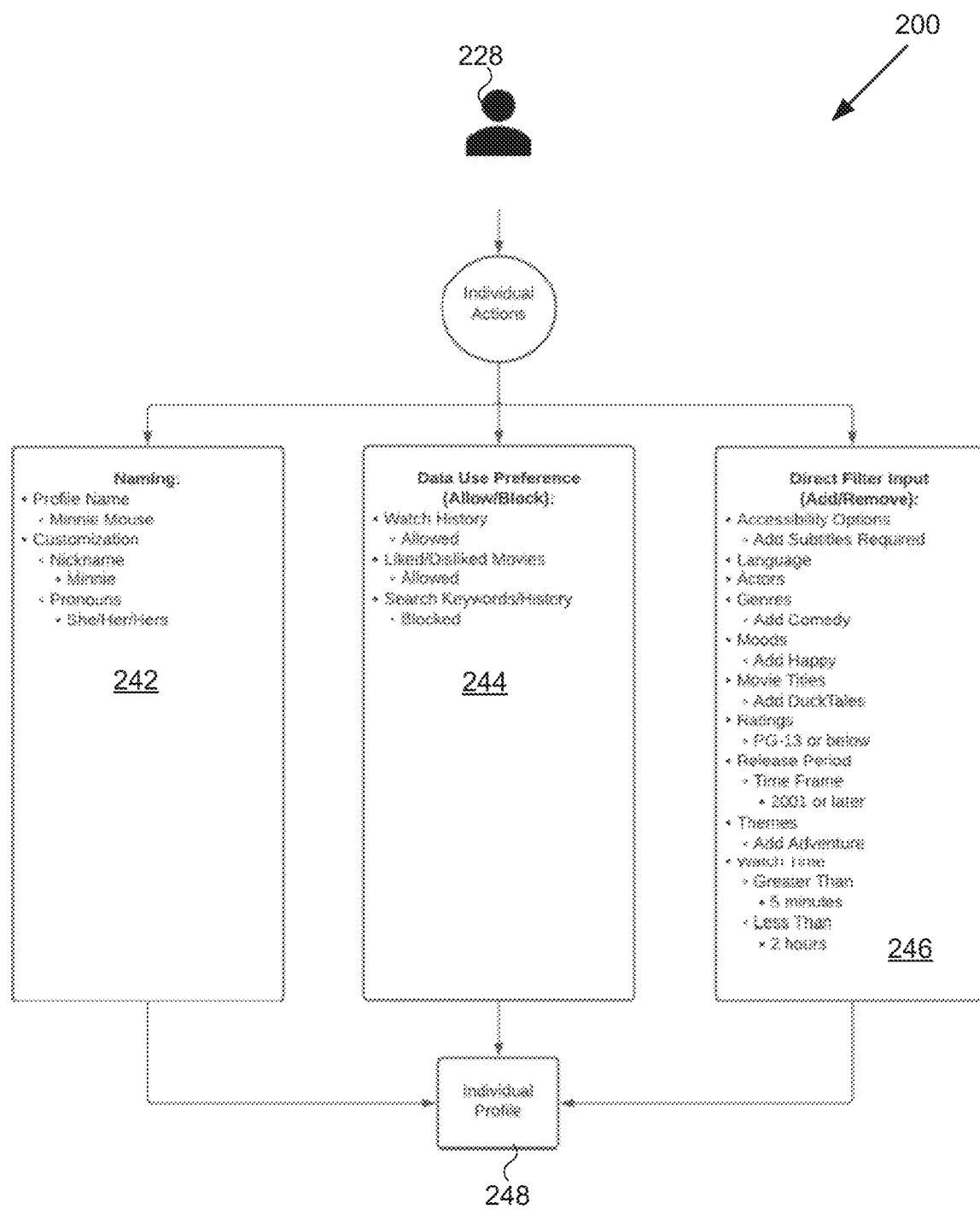
FIG. 2 shows a diagram depicting a preferences profile for an individual user, according to one implementation.

FIG. 2 shows diagram 200 depicting preferences profile 248 for individual user 228, according to one implementation. It is noted that user 228 may correspond to any or all of users 128a, 128b, and 128c, in FIG. 1. In addition, preferences profile 248 may correspond to a preferences profile of user 128a included in group generation data 130, in FIG. 1, or to either or both of preferences profiles 148b or 148c of respective users 128b and 128c. Thus, preferences profiles 148b and 148c may share any of the characteristics attributed to preferences profile 248 by the present disclosure, and vice versa.

Figure 3:
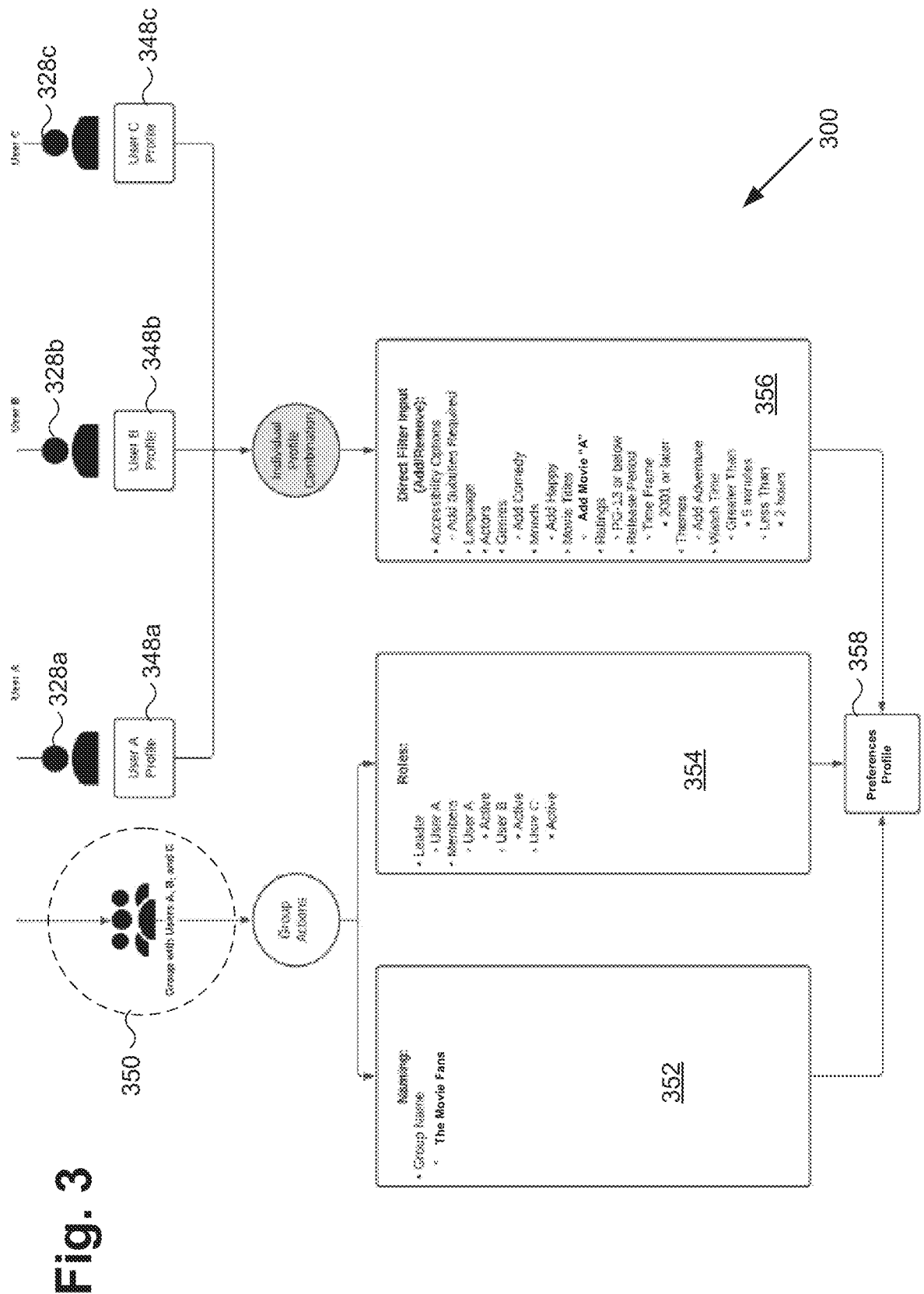
FIG. 3 shows a diagram depicting a process for synthesizing a group preferences profile of individual users included in the group, according to one implementation.
Figure 4:
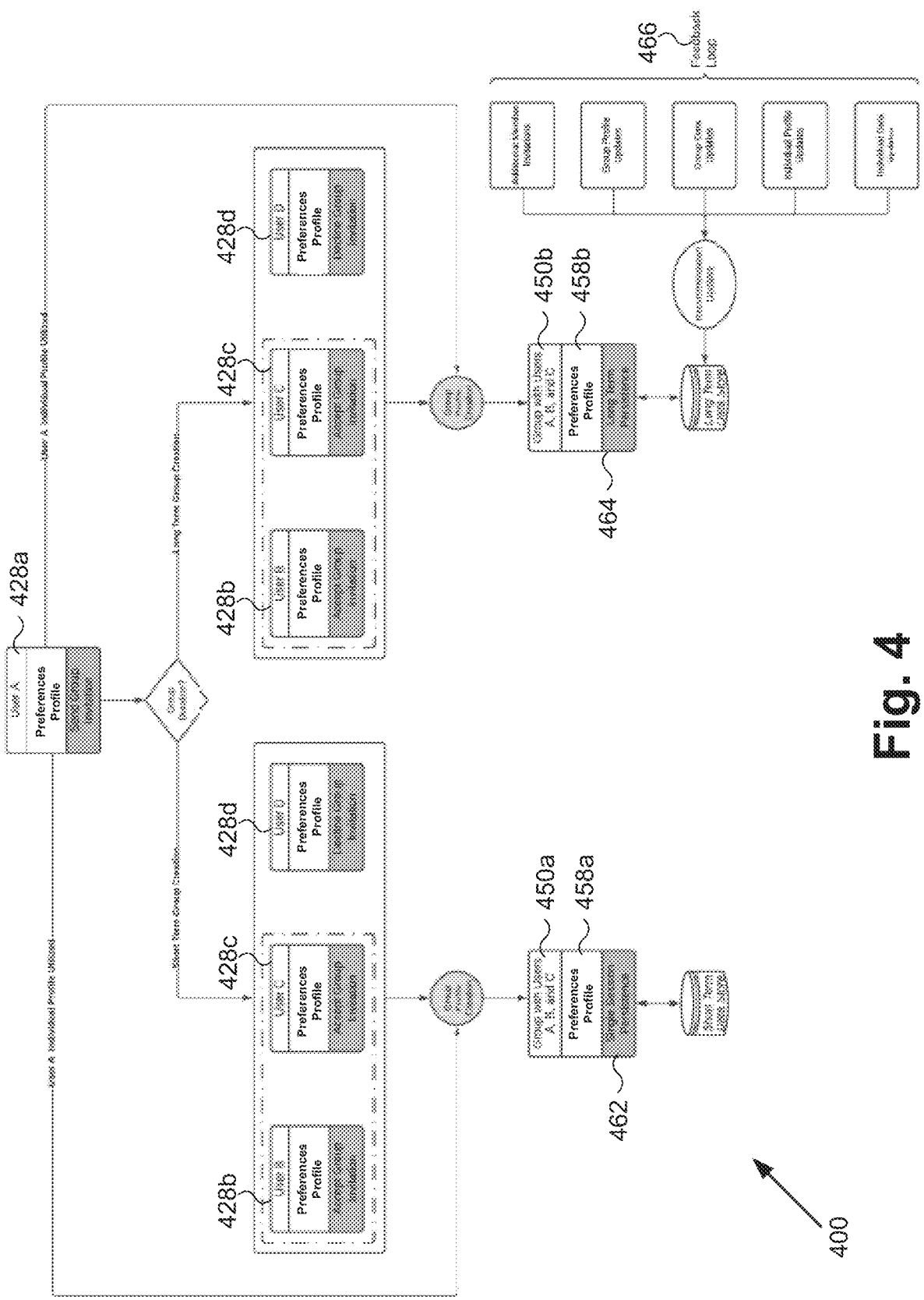
FIG. 4 shows a diagram depicting a process for synthesizing short term and long term group preferences profiles, according to various implementations.

It is further noted that although the methods and systems disclosed by the present application may be adapted for use in providing group recommendations for a wide variety of assets, such as collectable items for purchase, trade or sharing with other investors, entertainment events, and real-world attractions, such as theme park attractions, to name a few examples, the group recommendation solution depicted in FIGS. 2, 3, and 4, and outlined by flowchart 570 in FIG. 5, is described below by reference to the specific but non-limiting use case in which the asset or assets recommended to the group including users 128a/228, 128b/228, and 128c/228 is digital media content in the form of movies, music videos, video games, and TV series or particular TV episodes, whether broadcasted or streamed, for example. That is to say, according to use cases corresponding to the description provided below, users 128a/228, 128b/228, and 128c/228 may participate in a group movie, TV, or video game night, for instance.

As shown in FIG. 2, preferences profile 248 of individual user 228 enables user 228 to set their digital media content consumption preferences. According to the exemplary implementation shown in FIG. 2, user 228 takes actions that lead to the population of naming fields 242, data use preferences 244, and direct filter input profile values 246 that combine to provide preferences profile 248 of user 228. As can be seen from FIG. 2, there is significant flexibility for user 228 to tailor the settings to meet personal preferences. For example, direct filter input profile values 246 correspond to several filter types of filters allowing for selection of accessibility options, adding or removing particular actors, specifying watch time ranges, and so forth. It is noted that although user 228 may proactively populate their preferences profile 248, in some implementations, preferences profile may be populated or partially populated passively, based on a user history of user 228, rather than on affirmative preference profile selections entered by user 228.

User 228 can opt to share their user history, preferences profile, or both, with the group. In this way, a group member, i.e., user 228, can control which individual settings and personal usage history data can be used to influence the recommendations offered to the group. A custom recommendation will be generated for the group based on the input that each user 228 has entered into their own preferences profile, providing that user 228 has granted permission for sharing that preferences information. That is to say, user 228 can selectively share a portion of their user history, i.e., corresponding to user history 122a in FIG. 1, or preferences profile 248 with the group, or may selectively redact portions of their user history or preferences profile 248 before sharing the redacted user history or redacted preferences profile with the group. Alternatively, in some implementations, user 228 may opt in to share all of their user history or preferences profile 248, or may opt out to prevent sharing of any of their user history of preferences profile 248.

FIG. 3 shows diagram 300 depicting a process for synthesizing group preferences profile 358 based on preferences profiles 348a, 348b, and 348c of respective users 328a, 328b, and 328c included in group 350, according to one implementation. It is noted that users 328a, 328b, and 328c are also identified in FIG. 3 as users "A". "B,", and "C," respectively. Users 328a. 328b, and 328c correspond respectively to users 128a, 128b, and 128c, in FIG. 1, as well as to user 228, in FIG. 2. Preferences profiles 348a. 348b, and 348c correspond in general to preferences profiles 148b and 148c, in FIG. 1, as well as to preferences profile 248, in FIG. 2. Thus, preferences profiles 348a. 348b, and 348c may share any of the characteristics attributed to preferences profiles 148a/248 148b/248, and 148c/248 by the present disclosure, and vice versa.

According to the exemplary implementation shown in FIG. 3, group preferences profile 358 includes group naming field 352, group membership and roles 354, and aggregate group direct filter input profile values 356. Direct filter input profile values 246 from preferences profiles 348a, 348b, and 348c may be combined using an individual preferences profile combination algorithm. The use of such an algorithm permits the automated generation of the aggregate group direct filter input profile values 356 portion of group preferences profile 358.

It is noted that, in some implementations, each of users 328a. 328b, and 328c included in group 350 may update their respective preferences profiles 348a, 348b, and 348c manually at a later point in time. It is further noted that the present novel and inventive concepts contemplate distinguishing between long term groups, i.e., groups having their group profiles persistently stored by system 100, in FIG. 1, for example, and short term groups, i.e., groups persisting for a single group session or for a limited time, such as twenty-four (24) hours, 48 hours, or any other specified time interval. It is also noted that because a group session can include synchronous or asynchronous consumption of digital media content, a "single group session" may refer to synchronous consumption of digital media content of all members of a group concurrently or asynchronous consumption of digital media content by group members over a predetermined or open-ended period of time. That is to say, in the case of asynchronous consumption of digital media content, a single group session may terminate after a predetermined period of time, such 24 or 48 hours, for example, or may terminate only when every member of the group has finished consuming the digital media content.

For long term groups, modification of one or more of preferences profiles 348a, 348b, and 348c by respective users 328a. 328b, and 328c may result in automatic re-generation of group preferences profile 358 by system 100. Alternatively, or in addition, a change in status of a member of group 350, for example from "active" to "inactive," may result in automatic re-generation of group preferences profile 358 by system 100. That is to say, the preferences of group members who become inactive may be disregarded or afforded less weight relative to the preferences of active group members.

As yet another alternative, or in addition, group preferences profile 358 may be re-generated automatically by system 100 when a new user is added to a long term group to include the new user's preferences or when one of users 328a, 328b. 328c is removed from the group to exclude the preferences of the user that was removed from the group, in order to more fully reflect the preferences of the current group members. Such regeneration of group preferences is typically not implemented for short term groups, where individual preferences and group membership are contemplated to change less frequently than the entire lifecycle of the short term group.

In some implementations, the different types of filters corresponding to group direct filter input profile values 356 may be combined using different combinatorial rules. For example. "Add" filters may take the union of all direct filter input profile values 246 from preferences profiles 348a, 348b, and 348c, while "Add/Remove" filters may take the union of all entries of direct filter input profile values 246 from preferences profiles 348a, 348b, and 348c after correction for specified exclusions. That is to say, in some implementations, a "Remove" filter entry by one of users 328a, 328b, or 328c may override an "Add" filter entry by another of users 328a, 328b, or 328c. Range filters may take the most conservative range, i.e., the highest value of the "Greater Than" time duration in combination with the lowest value of the "Less Than" time duration, resulting in the smallest differential time duration.

It is noted that in use cases in which all of preferences profiles 348a. 348b, and 348c omit watch time filter values, the individual user profile combination algorithm may be configured to omit any watch time constraint from group preferences profile 358. It is further noted that the individual user profile combination algorithm may also be configured to omit any other filters values, such as accessibility options, or the addition or removal of particular actors, for example, when all of preferences profiles 348a. 348b, and 348c omit those selections. Moreover, if the algorithm encounters a group of users that have sparse individual preferences profiles, or users that have populated different portions of their individual preferences profiles, the algorithm may utilize user histories 122a, 122b, and 122c to generate group preferences profile 358 passively, as described above.

In the "zero population" use case in which each of preferences profiles 348a, 348b, and 348c omits any direct filter input profile values 246, user histories 122a, 122b, and 122c may also be used to generate group preferences profile 358. Alternatively, or in addition, in some zero population use cases a "smart filter" service may be triggered that would prompt each of users 328a, 328b, 328c to either accept or decline one or more filters that the service has recognized may apply for that individual, based for example, on commonly searched keywords or extrapolated from multi-occurrence tags on watch history items stored in user histories 122a. 122b, and 122c. As yet another alternative, or in addition, system 100 may provide a "surprise me" feature that would offer each of users 328a, 328b, 328c an opportunity to select one or more direct filter input fields to randomly populate using predetermined options for each filter category.

FIG. 4 shows diagram 400 depicting a process for synthesizing short term and long term group preferences profiles, according to various implementations. FIG. 4 includes users 428a, 428b, and 428c included in two different groups 450a and 450b having respective group preferences profiles 450a and 450b, as well as user 428d who has refused or otherwise declined invitations to join either of groups 450a or 450b. Users 428a, 428b, and 428c correspond respectively to users 128a/328a, 128b/328b, and 128c/328c, in FIGS. 1 and 3, as well as to user 228, in FIG. 2. In addition, groups 450a and 450b correspond in general to group 350, in FIG. 3. Also shown in FIG. 4 are short term persistence 462 of group 450a and group preferences profile 458a, long term persistence of group 450b and group preferences profile 458b, and feedback loop 466 for group 450b.

It is noted that any of users 428a, 428b, 428c, or 428d can belong to multiple groups concurrently, and may generate a different preferences profile for each different group. For example, as shown in FIG. 4, group 450a may include users 428a, 428b, and 428c having respective preferences profiles. However, users 428a, 428b, and 428c may also belong to another group 450b. In those use cases one or more of user 428a. 428b, and 428c may have a group 450b preferences profile different than their respective preferences profile for group 450a. Moreover, and as further shown in FIG. 4, group 450b may be a long term group having long term group preferences profile 458b persistently stored by system 100, while 450a may be a short term group having short term group preferences profile 458a that is deleted from system 100 after the occurrence of a predetermined action, such as a single group session, for example. It is further noted that modifications to the individual preferences profiles of one or more of users 428a, 428b, and 428c, or a change in activity status of one or more of users 428a, 428b, and 428c, or a change in membership of group 450b may result in automatic re-generation of preferences profile 458b of group 450b, as represented by feedback loop 466 that may identify changes to individual user preferences, changes in active/inactive status of group members, changes in group membership, or any combination thereof.

The functionality of software code 110, in FIG. 1, will be further described by reference to FIG. 5. FIG. 5 shows flowchart 570 presenting an exemplary method for performing user preferences based synthesis of group recommendations, according to one implementation. With respect to the method outlined by FIG. 5, it is noted that certain details and features have been left out of flowchart 570 in order not to obscure the discussion of the inventive aspects disclosed in the present application.

Referring to FIG. 5 in combination with FIGS. 1 and 3, flowchart 570 begins with receiving, from user 128a/328a group generation data 130 and preferences profile 348a of user 128a/328a, group generation data 130 identifying group 350 including user 128a/328a and at least one other user, i.e., one or more of users 128b/328b and 128c/328c (action 571). As shown by FIG. 1, in one implementation, group generation data 130 may be received from user 128a by system 100 via communication network 108 and network communication links 118. In those implementations, group generation data 130 may be received by software code 110, executed by processing hardware 104 of computing platform 102.

Continuing to refer to FIGS. 1 and 3 in combination with FIG. 5, flowchart 570 further includes sending, to the at least one other user, invitation 132 to join group 350 (action 572). As shown by FIG. 1, in one implementation, invitation 132 may be sent to one or more of users 128b and 128c via communication network 108 and network communication links 118. In those implementations, invitation 132 may be sent to one or more of users 128b and 128c by software code 110, executed by processing hardware 104 of computing platform 102.

Flowchart 570 further includes receiving, from one or more of users 128b and 128c, invitation response 134b. 134c, or both, in the form of one of an acceptance or a refusal of invitation 132 (action 573). As shown by FIG. 1, in one implementation, one or more of invitation responses 134b and 134c may be received from respective users 128b and 128c via communication network 108 and network communication links 118. In those implementations, one or more of invitation responses 134b and 134c may be received by software code 110, executed by processing hardware 104 of computing platform 102.

Flowchart 570 further includes obtaining, in response to receiving one or more of invitation responses 134b and 134c as an acceptance, one or more of preferences profiles 148b and 148c of respective users 128b and 128c (action 574). As shown by FIG. 1, in one implementation, one or more of preferences profiles 148b and 148c may be obtained from respective users 128b and 128c via communication network 108 and network communication links 118. In those implementations, one or more of preferences profiles 148b and 148c may be obtained in action 574 by software code 110, executed by processing hardware 104 of computing platform 102, and using GUI 114. Referring to FIG. 4, it is noted that when an invitation response is a refusal, such as when user 428d declines to join either of groups 450a or 450b, the preferences profile of that user, e.g., user 428d, is not obtained.

Referring to FIGS. 1, 3, and 5 in combination, flowchart 570 further includes generating, using preferences profile 348a of user 328a and one or more of preferences profiles 148b/348b and 148c/348c of respective users 128b/328b and 128c/328c, group preferences profile 358 for group 350 (action 575). Generation of group preferences profile 358 using preferences profile 348a of user 328a and one or more of preferences profiles 148b/348b and 148c/348c of respective users 128b/328b and 128c/328c, in action 575, may be performed by software code 110, executed by processing hardware 104 of computing platform 102, in the manner described above by reference to FIG. 3.

As noted above, in some use cases, it may be advantageous or desirable to generate group preferences profile 358 further using one or more of user histories 122a. 122b, and 122c, which, as shown by FIG. 1, may be accessed on user history database 120. In those use cases, processing hardware 104 of computing platform 102 may further execute software code 110 to obtain one or more of user histories 122a. 122b, and 122c from user history database 120, and to generate group preferences profile 358 in action 575 using one or more of user histories 122*a*. 122*b*, and 122*c*, as well as using preferences profile 348*a* of user 328*a* and one or more of preferences profiles 148*b*/348*b* and 148*c*/348*c* of respective users 128*b*/328*b* and 128*c*/328*c*.

Continuing to refer to FIGS. 1, 3, and 5 in combination, flowchart 570 further includes identifying, using recommendation engine 112 and group preferences profile 358, one or more assets in asset library 116 for group 350 (action 576). As noted above, the assets included in asset library 116 may include assets in a variety of different forms, such as digital media content, collectible items, entertainments events, or real-world attractions, such as theme park attractions, for example. Action 576 results in identification of group recommendation 138 for group 350, and may be performed by software code 110, executed by processing hardware 104 of computing platform 102, in various different ways.

For example, one approach to performing action 576 includes providing each of user 128*a*/328*a* and one or more of users 128*b*/328*b* and 128*c*/328*c* with an opportunity to update their individual preferences profiles and group preferences profile 358 as each sees fit. Group preferences profile 358, which is composed of a combination of explicitly selected preferences of each of user 128*a*/328*a* and one or more users 128*b*/328*b* and 128*c*/328*c* can then be used to filter the assets in asset library 116 for generating recommendations. The preferences profile of each member of group 350 and the set of filtered assets may then be fed into recommendation engine 112, which, as noted above, may include one or more machine learning predictive models. In some implementations, the resulting set of recommended assets may be processed using a sorting algorithm to generate a prioritized list of recommended assets for group 350.

Another approach to performing action 576 includes providing each of user 128*a*/328*a* and one or more of users 128*b*/328*b* and 128*c*/328*c* with an opportunity to enter their respective individual preferences profiles, but allows user 128*a*/328*a* and one or more of users 128*b*/328*b* and 128*c*/328*c* to enter different preferences when it comes to group preferences profile 358. Each of user 128*a*/328*a* and one or more of users 128*b*/328*b* and 128*c*/328*c* may also specify which settings in their respective individual preferences profiles may be shared to group preferences profile 358. That is to say, user 128*a*/328*a* and one or more of users 128*b*/328*b* and 128*c*/328*c* can selectively share a portion of their user history or preferences profiles with the group, or may selectively redact portions of their user histories or preferences profiles before sharing the redacted user histories or redacted preferences profiles with the group. Alternatively, in some implementations, user 128*a*/328*a* and one or more of users 128*b*/328*b* and 128*c*/328*c* may opt in to share all of their user histories or preferences profiles, or may opt out to prevent sharing of any of their user histories of preferences profiles.

The shared individual preferences profile information may then be combined with group preferences profile 358 and that combined information can be used to match to assets in asset library 116. A second phase may be added in this approach to further align the recommendation results with individual user preferences. For example, in one implementation, this second phase may include collecting behavioral data from the group members to predict recommendations. Such behavioral data may be information captured in the form of events or activities performed by the users while interacting with system 100. It is noted that one difference between this approach and the first approach to performing action 576 described above, is that in this process, all available user data, e.g., shared individual preferences, selected group preferences, behavioral data, and user histories 122*a*. 122*b*, and 122*c* may be utilized for identifying group recommendation 138.

It is noted that, in some implementations, actions 571, 572, 573, 574, 575, and 576 (hereinafter "actions 571-576") may be performed in an automated process from which participation of a system administrator of system 100 may be omitted. It is further noted that in some implementations, the method outlined by flowchart 570 may conclude with action 576 described above. However, in other implementations, flowchart 570 may further include displaying group recommendation 138 as a prioritized list of the one or more assets identified in action 576 to user 128*a*/328*a* and one or more of users 128*b*/328*b* and 128*c*/328*c* via GUI 114 (action 577). As shown in FIG. 1, group recommendation 138 may be displayed to user 128*a* and one or more of users 128*b* and 128*c* via GUI 114 in action 577 by software code 110, executed by processing hardware 104 of computing platform 102.

In some implementations, group recommendation 138 presented to user 128*a* and one or more of users 128*b* and 128*c* via GUI 114 is the result of a hybrid approach combining semi-personalized results, expert suggestions, and consumer popularity. Such a hybrid approach ensures that group recommendation 138 can be provided to all users regardless of the amount of information obtained from any individual group members. That is to say, even in the zero population use case described above, and even where user histories 122*a*, 122*b*, and 122*c* are unavailable, group recommendation 138 based on expert suggestions, consumer popularity, or both, can be provided.

Semi-personalized results are based on direct input from the group preferences profile, and from individual preferences profiles, as discussed above. Examples of direct inputs could be favorite genres, preferred actors, or selected mood. These inputs are based on metadata, so, as long as preferences are defined, the system can match and can filter results based on the characteristics provided by the group members. More sophisticated and personalized results can be provided when group member behavior or user histories are available to recommendation engine 112. Individual behaviors or actions such as selection of a particular asset, a search using specific filtering criteria, or "like" or "dislike" responses to an asset, provide a way to identify users of system 100 that share tastes in common. Finding similarities among users facilitates the formation of groups, which provides a way to predict recommendations likely to have a high rate of acceptance by members of the same group. In addition, actions taken by a group in response to group recommendation 138 become additional input to system 100. For instance, whether a group selects, or does not select, an asset recommended by system 100 provides feedback for use the next time a group recommendation is provided.

Group recommendation 138 may be presented in three sections, for example. In the case of digital media content recommendation, for instance, each of the three sections may include a title, and a description of the content that is being recommended, as well as additional information related to the data that was used by system 100 to provide the recommendation.

The "Group Recommendation" section of group recommendation 138 may include content identified based on the likelihood that such content is likely to be selected and enjoyed by members of the group. This section could be sorted by percentage or probability of matching the group or individual preferences. In addition, group recommendation 138 may also include "Expert Advice" and "Popular Content" in separate sections.

The "Expert Advice" section may be curated using a specific source and may be sorted using filters such as "Critics Choice," or "Most Acclaimed." for example. The "Popular Content" recommendation may be selected from content that is highly in demand by users of system 100, and may be sorted using filters such as "Most Watched," or "Most Liked." In some implementations, the various filters used can be further customized for different groups.

It is noted that in various use cases, the assets identified for the group in action 576 and included in group recommendation 438 displayed in action 577 may be enjoyed by the group members together, as a collective experience at the same time, or asynchronously. For example, in some implementations, the group activity supported by system 100 may follow an asynchronous. "book club" type model, where some or all group member are free to experience the assets included in group recommendation 138 individually, on their own schedule, for later collaborative discussion or review by the group as a whole.

In some implementations, processing hardware 104 may further execute software code 110 to improve the performance of recommendation engine 112 through machine learning. For example, software code 110 may track inputs to GUI 114 by a system administrator of system 100, and record the extent to which the system administrator corrects or otherwise changes group recommendations 138 generated using recommendation engine 112. Alternatively, or in addition, feedback in the form of ratings provided by user 128a or one or more of users 128b and 128c in response to receiving group recommendation 138 from system 100 may be used to further improve the performance of recommendation engine 112. That information can be used as feedback to recommendation engine 112 to better learn the preferences of user 128a and one or more of users 128b and 128c as a group.

With respect to the method outlined by flowchart 570, it is emphasized that, in some implementations, actions 571-576, or actions 571-576 and action 577, may be performed in an automated process from which human involvement may be omitted.

Thus, the present application discloses systems and methods for performing user preferences based synthesis of group recommendations. The present group recommendation solution advances the state-of-the-art by enabling a highly contextual and group-based customizable presentation of preferences. According to the present group recommendation solution, each group has a different group profile that can be customized by its members. In addition, the present solution advantageously enables individual users to engage in both short term and long term group experiences based on their personal privacy preferences. That is to say, the present group recommendation solution permits for a persistently saved individual user profile with preferences, as well as single-session user profile updates, in order to support short term and long term group engagement. Moreover, in the context of digital media content group recommendations, the solution disclosed by the present application can advantageously be integrated with existing content streaming services.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a processing hardware and a system memory;
an asset library and a software code including a recommendation engine stored in the system memory;
the processing hardware configured to execute the software code to:
receive, from a user, a group generation data and a preferences profile of the user, the group generation data identifying a group including the user and at least one other user;
send, to the at least one other user, an invitation to join the group;
modify or redact, in response to receiving an acceptance of the invitation and input from the at least one other user, a subset of preferences in an original preferences profile of the at least one other user to generate a preferences profile of the at least one other user, wherein the modified or redacted subset of preferences in the original preferences profile is less than all preferences included in the original preferences profile;
obtain, in response to receiving the acceptance of the invitation, the preferences profile of the at least one other user;
generate, using the preferences profile of the user and the preferences profile of the at least one other user, a group preferences profile for the group;
identify, using the recommendation engine, the group preferences profile, and a selection criterion other than the group preferences profile, one or more assets in the asset library for the group; and
output a group recommendation, the group recommendation identifying the identified one or more assets.

2. The system of claim 1, wherein the software code is configured to provide a graphical user interface (GUI), and wherein the processing hardware is further configured to execute the software code to display a prioritized list of the one or more identified assets to the user and the at least one other user via the GUI.

3. The system of claim 1, further comprising a user history database including a user history of at least one of the user or the at least one other user;
wherein the processing hardware is further configured to execute the software code to obtain the user history from the user history database;
wherein the group preferences profile is generated further using the user history.

4. The system of claim 1, wherein the group preferences profile is a short term profile that is deleted from the system after an occurrence of a predetermined action.

5. The system of claim 1, wherein the group preferences profile is re-generated automatically by the system when a new user is added to the group or when one of the user or the at least one other user is removed from the group.

6. The system of claim 1, wherein the processing hardware is further configured to execute the software code to:

receive, from the user or the at least one other user, a selection of a first asset of the identified one or more assets; and present the first asset to the user and the at least one other user for asynchronous consumption.

7. The system of claim 1, wherein the processing hardware is further configured to execute the software code to:

receive, from the user or the at least one other user, a selection of a first asset of the identified one or more assets; and present the first asset to the user and the at least one other user for synchronous consumption.

8. The system of claim 1, wherein the identified one or more assets comprise at least one of a digital media content, a collectable item, an entertainment event, or a theme park attraction.

9. The system of claim 1, wherein the recommendation engine includes at least one machine learning (ML) predictive model, and wherein the processing hardware is further configured to execute the software code to:

receive, from a system administrator of the system, a corrective input changing the group recommendation to a revised group recommendation; and improve, by applying machine learning based on the corrective input, a performance of the recommendation engine including the at least one ML predictive model.

10. The system of claim 1, wherein a filtering criteria included in at least one of the preferences profile of the user or the preferences profile of the at least one other user comprises at least one of (i) one or more of actors, (ii) mood, or (iii) watch time.

11. The system of claim 4, wherein the predetermined action is a single group session.

12. A method for use by a system including a computing platform having a processing hardware and a system memory storing an asset library and a software code including a recommendation engine, the method comprising:

receiving, by the software code executed by the processing hardware, from a user, a group generation data and a preferences profile of the user, the group generation data identifying a group including the user and at least one other user;

sending to the at least one other user, by the software code executed by the processing hardware, an invitation to join the group;

modifying or redacting, by the software code executed by the processing hardware in response to receiving an acceptance of the invitation and input from the at least one other user, a subset of preferences in an original preferences profile of the at least one other user to generate a preferences profile of the at least one other user, wherein the modified or redacted subset of preferences in the original preferences profile is less than all preferences included in the original preferences profile;

obtaining, by the software code executed by the processing hardware in response to receiving the acceptance of the invitation, the preferences profile of the at least one other user;

generating, by the software code executed by the processing hardware and using the preferences profile of the user and the preferences profile of the at least one other user, a group preferences profile for the group;

identifying, by the software code executed by the processing hardware and using the recommendation engine, the group preferences profile, and a selection criterion other than the group preferences profile, one or more assets in the asset library for the group; and outputting a group recommendation, by the software code executed by the processing hardware, the group recommendation identifying the identified one or more assets.

13. The method of claim 12, wherein the software code is configured to provide a graphical user interface (GUI), the method further comprising:

displaying, by the software code executed by the processing hardware, a prioritized list of the one or more identified assets to the user and the at least one other user via the GUI.

14. The method of claim 12, wherein the system further comprises a user history database including a user history of at least one of the user or the at least one other user, the method further comprising:

obtaining, by the software code executed by the processing hardware, the user history from the user history database;

wherein generating the group preferences profile is further uses the user history.

15. The method of claim 12, further comprising:

deleting the group preferences profile from the system, by the software code executed by the processing hardware, after an occurrence of a predetermined action.

16. The method of claim 12, further comprising:

automatically regenerating, by the software code executed by the processing hardware, the group preferences profile when a new user is added to the group or when one of the user or the at least one other user is removed from the group.

17. The method of claim 12, further comprising:

receiving from the user or the at least one other user, by the software code executed by the processing hardware, a selection of a first asset of the identified one or more assets; and presenting by the software code executed by the processing hardware, the first asset to the user and the at least one other user for asynchronous consumption.

18. The method of claim 12, further comprising:

receiving from the user or the at least one other user, by the software code executed by the processing hardware, a selection of a first asset of the identified one or more assets; and presenting by the software code executed by the processing hardware, the first asset to the user and the at least one other user for synchronous consumption.

19. The method of claim 12, wherein the identified one or more assets comprise at least one of a digital media content, a collectable item, an entertainment event, or a theme park attraction.

20. The method of claim 12, wherein the recommendation engine includes at least one machine learning (ML) predictive model, the method further comprising:

receiving from a system administrator of the system, by the software code executed by the processing hardware, a corrective input changing the group recommendation to a revised group recommendation; and improving, by the software code executed by the processing hardware and applying machine learning based on the corrective input, a performance of the recommendation engine including the at least one ML predictive model.

21. The method of claim 12, wherein a filtering criteria included in at least one of the preferences profile of the user or the preferences profile of the at least one other user comprises at least one of (i) one or more of actors, (ii) mood, or (iii) watch time.

22. The method of claim 15, wherein the predetermined action is a single group session.

* * * * *